US006369024B1

(12) United States Patent
Panandiker et al.

(10) Patent No.: US 6,369,024 B1
(45) Date of Patent: Apr. 9, 2002

(54) LAUNDRY DETERGENT COMPOSITIONS WITH LINEAR AMINE BASED POLYMERS TO PROVIDE APPEARANCE AND INTEGRITY BENEFITS TO FABRICS LAUNDERED THEREWITH

(75) Inventors: Rajan Keshav Panandiker, West Chester; Sherri Lynn Randall, Hamilton; Eugene Paul Gosselink, Cincinnati, all of OH (US); William Conrad Wertz, West Harrison, IN (US); Sören Hildebrandt, Speyer (DE); Elisabeth Kappes; Dieter Boeckh, both of Limburgerhof (DE)

(73) Assignee: The Procter & Gamble Company, Cincinnati, OH (US)

( * ) Notice: Subject to any disclaimer, the term of this patent is extended or adjusted under 35 U.S.C. 154(b) by 0 days.

(21) Appl. No.: 09/508,607

(22) PCT Filed: Sep. 15, 1998

(86) PCT No.: PCT/US98/19140

§ 371 Date: Mar. 14, 2000

§ 102(e) Date: Mar. 14, 2000

(87) PCT Pub. No.: WO99/14297

PCT Pub. Date: Mar. 25, 1999

Related U.S. Application Data

(60) Provisional application No. 60/058,810, filed on Sep. 15, 1997.

(51) Int. Cl.[7] .............................. C11D 3/30; C11D 3/37; C11D 7/32

(52) U.S. Cl. ........................ 510/499; 510/350; 510/503; 510/504

(58) Field of Search ................................ 510/350, 499, 510/503

(56) References Cited

U.S. PATENT DOCUMENTS

| | | | |
|---|---|---|---|
| 3,761,418 A | | 9/1973 | Parran ........................ 252/106 |
| 4,065,257 A | | 12/1977 | Coe et al. ........................ 8/74 |
| 4,263,179 A | | 4/1981 | Schmolka .................... 252/548 |
| 4,597,898 A | * | 7/1986 | Vander Meer .............. 252/529 |
| 4,664,848 A | * | 5/1987 | Oh et al. ..................... 252/547 |
| 4,891,160 A | * | 1/1990 | Vander Meer .............. 252/545 |
| 5,221,496 A | | 6/1993 | Holland ....................... 252/143 |
| 5,565,145 A | * | 10/1996 | Watson et al. .............. 510/350 |
| 6,004,922 A | * | 12/1999 | Watson et al. .............. 510/476 |
| 6,057,278 A | * | 5/2000 | Gosselink et al. .......... 510/400 |

FOREIGN PATENT DOCUMENTS

| | | | |
|---|---|---|---|
| EP | 232092 | 8/1987 | ............ C11D/3/30 |
| WO | WO 97/42286 | 11/1997 | ............ C11D/3/37 |

* cited by examiner

*Primary Examiner*—Gregory Delcotto
(74) *Attorney, Agent, or Firm*—Richard S. Echler, Sr.; C. Brant Cook; Kim W. Zerby

(57) ABSTRACT

Compositions and methods which utilize certain linear amine based polymer, oligomer, or copolymer materials as fabric treatment agents that can impart fabric appearance benefits to fabrics and textiles laundered in washing solutions which contain such materials.

10 Claims, No Drawings

LAUNDRY DETERGENT COMPOSITIONS WITH LINEAR AMINE BASED POLYMERS TO PROVIDE APPEARANCE AND INTEGRITY BENEFITS TO FABRICS LAUNDERED THEREWITH

This Application claims priority to Provisional Application Ser. No. 60/058,810 filed Sep. 15, 1997.

TECHNICAL FIELD

The present invention relates to compositions, in either liquid or granular form, for use in laundry applications, wherein the compositions comprise certain linear amine based polymer, oligomer or copolymer materials which impart appearance and integrity benefits to fabrics and textiles laundered in washing solutions formed from such compositions.

BACKGROUND OF THE INVENTION

It is, of course, well known that alternating cycles of using and laundering fabrics and textiles, such as articles of worn clothing and apparel, will inevitably adversely affect the appearance and integrity of the fabric and textile items so used and laundered. Fabrics and textiles simply wear out over time and with use. Laundering of fabrics and textiles is necessary to remove soils and stains which accumulate therein and thereon during ordinary use. However, the laundering operation itself, over many cycles, can accentuate and contribute to the deterioration of the integrity and the appearance of such fabrics and textiles.

Deterioration of fabric integrity and appearance can manifest itself in several ways. Short fibers are dislodged from woven and knit fabric/textile structures by the mechanical action of laundering. These dislodged fibers may form lint, fuzz or "pills" which are visible on the surface of fabrics and diminish the appearance of newness of the fabric. Further, repeated laundering of fabrics and textiles, especially with bleach-containing laundry products, can remove dye from fabrics and textiles and impart a faded, worn out appearance as a result of diminished color intensity, and in many cases, as a result of changes in hues or shades of color.

Given the foregoing, there is clearly an ongoing need to identify materials which could be added to laundry detergent products that would associate themselves with the fibers of the fabrics and textiles laundered using such detergent products and thereby reduce or minimize the tendency of the laundered fabric/textiles to deteriorate in appearance. Any such detergent product additive material should, of course, be able to benefit fabric appearance and integrity without unduly interfering with the ability of the laundry detergent to perform its fabric cleaning function. The present invention is directed to the use of linear amine based polymer, oligomer or copolymer materials in laundry applications which perform in this desired manner.

SUMMARY OF THE INVENTION

Linear amine based polymer, oligomer or copolymer materials which are suitable for use in laundry operations and provide the desired fabric appearance and integrity benefits can be characterized by the following general formula:

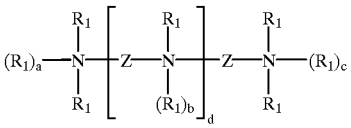

wherein:
each $R_1$ is independently selected from the group consisting of H, linear or branched $C_1$–$C_{12}$ alkyl, hydroxyalkyl, cycloalkyl, aryl, alkylaryl, piperidinoalkyl and other substituted derivatives of piperidine, morpholinoalkyl and other substituted derivatives of morpholine, substituted derivatives of aryl, substituted derivatives of alkylaryl,

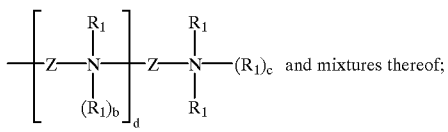

A is a compatible anion;
a=0 or 1;
b=0 or 1;
c=0 or 1;
d=from 0 to about 50, preferably from 0 to about 25 and most preferably from about 4 to about 20;
e=number required to obtain charge neutrality;

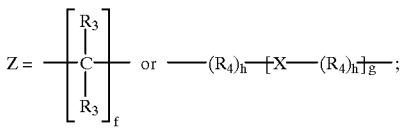

wherein:
each $R_3$ is independently selected from the group consisting of H, $C_1$–$C_{12}$ alkyl, aryl, alkylaryl, substituted derivatives of aryl, substituted derivatives of alkylaryl, hydroxy, amino, alkoxy, halogen and mixtures thereof;
each $R_4$ is independently selected from the group consisting of linear or branched alkylene, hydroxyalkylene, and substituted alkylene residues;
X is selected from the group consisting of phenylene, cyclohexylene, substituted residues of phenylene, substituted residues of cyclohexylene, —O—, —COO— and —CON($R_5$)—;
$R_5$ is selected from the group consisting of H, $C_1$–$C_4$ alkyl and hydroxyalkyl;
f=from about 2 to about 12;
g=from about 1 to about 10 when X is —COO— or —CON($R_5$)—;
g=from about 1 to about 100 when X is —O—; otherwise
g=1;
h=0 or 1;
provided that when one $R_3$ group is hydroxy or amino, the other $R_3$ group on the same carbon is not a hydroxy, amino or halogen; and
further provided that within Z no carbon has more than one substituent selected from the group consisting of hydroxy, amino, and halo.

The linear amine based polymer, oligomer or copolymer materials defined above can be used as a washing solution additive in either granular or liquid form. Alternatively, they can be admixed to granular detergents, dissolved in liquid detergent compositions or added to a fabric softening composition. The forgoing description of uses for the linear amine based fabric treatment materials defined herein are intended to be exemplary and other uses will be apparent to those skilled in the art and are intended to be within the scope of the present invention.

The laundry detergent compositions herein comprise from about 1% to 80% by weight of a detersive surfactant, from about 0.1% to 80% by weight of an organic or inorganic detergency builder and from about 0.1% to 5% by weight of the linear amine based fabric treatment materials of the present invention. The detersive surfactant and detergency builder materials can be any of those useful in conventional laundry detergent products.

Aqueous solutions of the linear amine based polymer, oligomer or copolymer materials of the subject invention comprise from about 0.1% to 80% by weight of the linear amine based fabric treatment materials dissolved in water and other ingredients such as stabilizers and pH adjusters.

In its method aspect, the present invention relates to the laundering or treating of fabrics and textiles in aqueous washing or treating solutions formed from effective amounts of the detergent compositions described herein, or formed from the individual components of such compositions. Laundering of fabrics and textiles in such washing solutions, followed by rinsing and drying, imparts fabric appearance benefits to the fabric and textile articles so treated. Such benefits can include improved overall appearance, pill/fuzz reduction, antifading, improved abrasion resistance, and/or enhanced softness.

DETAILED DESCRIPTION OF THE INVENTION

As noted, when fabric or textiles are laundered in wash solutions which comprise the linear amine based polymer, oligomer or copolymer materials of the present invention fabric appearance and integrity are enhanced. The linear amine based fabric treatment materials can be added to wash solutions by incorporating them into a detergent composition, a fabric softener or by adding them separately to the washing solution. The linear amine based fabric treatment materials are described herein primarily as liquid or granular detergent additives but the present invention is not meant to be so limited. The linear amine based fabric treatment materials, detergent composition components, optional ingredients for such compositions and methods of using such compositions, are described in detail below. All percentages are by weight unless other specified.

A) Linear Amine Based Polymer, Oligomer or Copolymer Materials

The essential component of the compositions of the present invention comprises one or more linear amine based polymer, oligomer or copolymer. Such materials have been found to impart a number of appearance benefits to fabrics and textiles laundered in aqueous washing solutions formed from detergent compositions which contain such linear amine based fabric treatment materials. Such fabric appearance benefits can include, for example, improved overall appearance of the laundered fabrics, reduction of the formation of pills and fuzz, protection against color fading, improved abrasion resistance, etc. The linear amine based fabric treatment materials used in the compositions and methods herein can provide such fabric appearance benefits with acceptably little or no loss in cleaning performance provided by the laundry detergent compositions into which such materials are incorporated.

The linear amine based polymer, oligomer or copolymer component of the compositions herein may comprise combinations of these linear amine based materials. For example, a mixture of epichlorohydrine (sometimes referred to herein as "epi") and hexamethylenediamine condensates (sometimes referred to herein as "HMDA") can be combined with a mixture of bis(hexamethylene)triamine (sometimes referred to herein as "BHMT") and epihalohydrine condensates to achieve the desired fabric treatment results. Moreover, the molecular weight of linear amine based fabric treatment materials can vary within the mixture as is illustrated in the Examples below.

As will be apparent to those skilled in the art, an oligomer is a molecule consisting of only a few monomer units while polymers comprise considerably more monomer units. For the present invention, oligomers are defined as molecules having an average molecular weight below about 1,000 and polymers are molecules having an average molecular weight of greater than about 1,000. Copolymers are polymers or oligomers wherein two or more dissimilar monomers have been simultaneously or sequentially polymerized. Copolymers of the present invention can include, for example, polymers or oligomers polymerized from a mixture of a primary linear amine based monomer, e.g., bis (hexamethylene)triamine, and a secondary linear amine monomer, e.g., epichlorohydrine.

The linear amine based fabric treatment component of the detergent compositions herein will generally comprise from about 0.1% to about 5% by the weight of the detergent composition. More preferably, such linear amine based fabric treatment materials will comprise from about 0.5% to about 4% by weight of the detergent compositions, most preferably from about 0.75% to about 3%. However, as discussed above, when used as a washing solution additive, i.e. when the linear amine based fabric treatment component is not incorporated into a detergent composition, the concentration of the linear amine based component can comprise from about 0.1% to about 80% by weight of the additive material.

One suitable group of linear amine based polymer, oligomer or copolymer materials for use herein is characterized by the following formula:

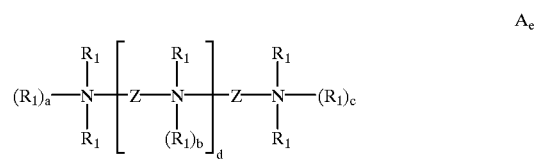

wherein:
each $R_1$ is independently selected from the group consisting of H, linear or branched $C_1$–$C_{12}$ alkyl, hydroxyalkyl, cycloalkyl, aryl, alkylaryl, piperidinoalkyl and other substituted derivatives of piperidine, morpholinoalkyl and other substituted derivatives of morpholine, substituted derivatives of aryl, substituted derivatives of alkylaryl,

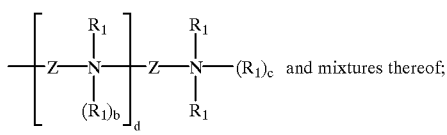

A is a compatible anion;
a=0 or 1;
b=0 or 1;
c=0 or 1;
d=from 0 to about 50, preferably from 0 to about 25 and most preferably from about 4 to about 20;
e=number required to obtain charge neutrality;

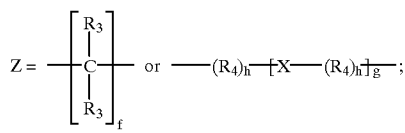

wherein:
each $R_3$ is independently selected from the group consisting of H, $C_1$–$C_{12}$ alkyl, aryl, alkylaryl, substituted derivatives of aryl, substituted derivatives of alkylaryl, hydroxy, amino, alkoxy, halogen and mixtures thereof;

each $R_4$ is independently selected from the group consisting of linear or branched alkylene, hydroxyalkylene, and substituted alkylene residues;

X is selected from the group consisting of phenylene, cyclohexylene, substituted residues of phenylene, substituted residues of cyclohexylene, —O—, —COO— and —CON($R_5$)—;

$R_5$ is selected from the group consisting of H, $C_1$–$C_4$ alkyl and hydroxyalkyl;

f=from about 2 to about 12;

g=from about 1 to about 10 when X is —COO— or —CON($R_5$)—;

g=from about 1 to about 100 when X is —O—; otherwise g=1;

h=0 or 1;

provided that when one $R_3$ group is hydroxy or amino, the other $R_3$ group on the same carbon is not a hydroxy, amino or halogen; and further provided that within Z no carbon has more than one substituent selected from the group consisting of hydroxy, amino, and halo.

Preferred compounds include those defined below by the simplified structures and examples.

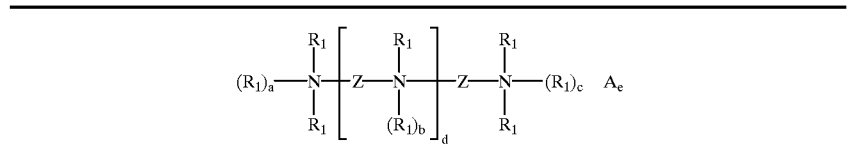

| R1 | a/b/c | Z | d | Example |
|---|---|---|---|---|
| CH3 | 0 | —(CH2)6— | 0 | Methylated HMDA |
| CH3 | 0 | —(CH2)6— | 1 | Methylated BHMT |
| CH3 | 1 | —(CH2)6— | 0 | Quaternized HMDA |
| CH3 | 1 | —(CH2)6— | 1 | Quaternized BHMT |
| CH2CH2OH or H | 0 | —CH2—CH2—CH2— or —CH2—CH(OH)—CH2 | 2–8 | aminopropyldiethanolamine:epi, d depends on the ratio of amine:epi |
| CH3—CH2 or H | 0 | —(CH2)3—CH—(CH3)— or —CH2—CH(OH)—CH2 | 2–12 | 2 amino 5diethylaminopentane:epi, d depends on the ratio of amine:epi |

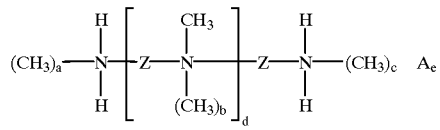

| a/b/c | Z | d | Example |
|---|---|---|---|
| 0 or 1 | —(CH2)6— | 6 | Ionene polymer made by condensation of NNNN tetramentyl hexamethylenediamine and 1,6 dibromo hexane (ratio 4:3) |
| 0 or 1 | —(CH2)6— or —(CH2)12— | 6 | Ionene polymer made by condensation of NNNN tetramethyl hexanediamine and 1,6 dibromo dodecane (ratio 4:3) |
| 0 or 1 | —(CH2)6— | 4 | Ionene polymer made by condensation of NNNN tetramentyl hexamethylenediamine and 1,6 dibromo hexane (ratio 3:2) |

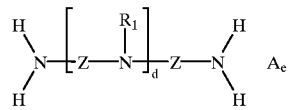

-continued

| R₁ | Z | d | Example |
|---|---|---|---|
| —(CH2)₃—NH2 | —CH2—CH2—CH2—CH2— or —CH2—CH2—CH2 | 2 | NNNN tetrakis(aminopropyl) butanediamine |
| —(CH2)₃—NH2 | —(CH2)₆— or —CH2—CH2—CH2 | 2 | NNNN tetrakis(aminopropyl) Hexanediamine |
| H or CH3 | —CH2—CH2—CH2— or —CH2—CH(OH)—CH2 | 4–12 | N,N bis(3-aminopropyl)methylamine:epi, d depends on the ratio of amine:epi |

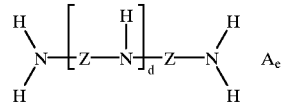

| Z | d | Example |
|---|---|---|
| —(CH2)₆— or —CH2—CH(OH)—CH2— | 1–10 | HMDA-epi, m depends on the ratio of HMDA:epi d = 1 if HMDA:epi are in the ratio of 2:1 |
| —(CH2)₆— or —CH2—CH(OH)—CH2— | 4–12 | BHMT-epi, m depends on the ratio of BHMT:epi d = 1 if BHMT:epi are in the ratio of 2:1 |
| —CH2—CH2—CH2— | 0 | propanediamine |
| —(CH2)₆— | 0 | hexamethylenediamine |
| —(CH2)₈— | 0 | octanediamine |
| —CH2—CH2—CH2— | 1 | dipropylenetriamine |
| —(CH2)₆— | 1 | Bis(hexamethylene)triamine |
| —CH2—CH2— or —CH2—CH2—CH2— | 1 | 2 aminoethyl 1,3 propane diamine |
| —CH2—CH2— or —CH2—CH—(CH3)—CH2— | 1 | 2 aminoethyl 1,2 propane diamine |
| —CH2—CH2— or —CH2—CH2—CH2— | 2 | bis(aminopropyl)ethylene diamine |

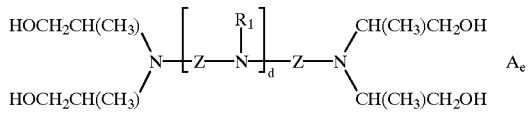

| R1 | Z | d | Example |
|---|---|---|---|
| CH(CH3)CH2OH | —(CH2)₆— | 1 | Hydroxypropylated BHMT |
| CH(CH3)CH2OH | —(CH2)₆— or —CH2—CH(OH)—CH2 | 2–8 | Hydroxypropyl BHMT-epi |
| CH(CH3)CH2OH or CH3 | —(CH2)₃—CH—(CH3)— or —CH2—CH(OH)—CH2 | 4–12 | Hydroxypropyl N,N bis(3aminopropyl) methylamine:epi |

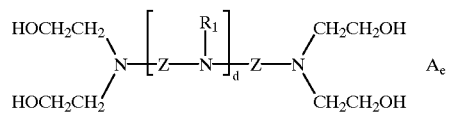

| R1 | Z | d | Example |
|---|---|---|---|
| CH2CH2OH | —(CH2)₆— | 1 | Hydroxyethylated BHMT |
| CH2CH2OH | —(CH2)₆— or —CH2—CH(OH)—CH2 | 4–12 | Hydroxyethylated BHMT-epi |
| CH2CH2OH | —CH2—CH2—CH2— or —CH2—CH(OH)—CH2 | 2–8 | Hydroxyethylated aminopropyldiethanolamine:epi |
| CH2CH2OH or CH3 | —CH2—CH2—CH2— or —CH2—CH(OH)—CH2 | 4–12 | Hydroxyethylated N,N bis(3aminopropyl)methylamine:epi |
| CH2—CH2—OH | —(CH2)₃—CH—(CH3)— or —CH2—CH(OH)—CH2 | 2 | Hydroxyethylated 2 amino 5diethylaminopentane |
| CH(CH3)CH2OH | —CH2—CH2—CH2— or —CH2—CH(OH)—CH2 | 4–12 | Hydroxypropyl aminopropyldiethanolamine:epi |

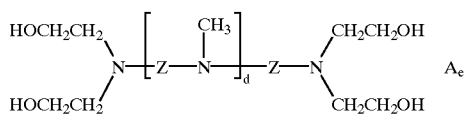

| Z | d | Example |
|---|---|---|

-continued

| | | |
|---|---|---|
| —(CH2)$_6$— | 1 | Methyl quat of hydroxyethyl BHMT |
| —CH2—CH2—CH2— or<br>—CH2—CH(OH)—CH2 | 2 | Methyl quat of Hydroxyethylated BHMT-epi |

Preferred compounds to be used as the linking group Z include, but are not limited to: polyepoxides, ethylenecarbonate, propylenecarbonate, urea, α, β-unsaturated carboxylic acids, esters of α, β-unsaturated carboxylic acids, amides of α, β-unsaturated carboxylic acids, anhydrides of α, β-unsaturated carboxylic acids, di- or polycarboxylic acids, esters of di- or polycarboxylic acids, amides of di- or polycarboxylic acids, anhydrides of di- or polycarboxylic acids, glycidylhalogens, chloroformic esters, chloroacetic esters, derivatives of chloroformic esters, derivatives of chloroacetic esters, epihalohydrins, glycerol dichlorohydrins, bis-(halohydrins), polyetherdihalo-compounds, phosgene, polyhalogens, functionalized glycidyl ethers and mixtures thereof. Moreover, Z can also comprise a reaction product formed by reacting one or more of polyetherdiamines, alkylenediamines, polyalkylenepolyamines, alcohols, alkyleneglycols and polyalkyleneglycols with α, β-unsaturated carboxylic acids, esters of α, β-unsaturated carboxylic acids, amides of α, β-unsaturated carboxylic acids and anhydrides of α, β-unsaturated carboxylic acids provided that the reaction products contain at least two double bonds, two carboxylic groups, two amide groups or two ester groups.

B) Detersive Surfactant

The detergent compositions herein comprise from about 1% to 80% by weight of a detersive surfactant. Preferably such compositions comprise from about 5% to 50% by weight of surfactant. Detersive surfactants utilized can be of the anionic, nonionic, zwitterionic, ampholytic or cationic type or can comprise compatible mixtures of these types. Detergent surfactants useful herein are described in U.S. Pat. No. 3,664,961, Norris, issued May 23, 1972, U.S. Pat. No. 3,919,678, Laughlin et al., issued Dec. 30, 1975, U.S. Pat. No. 4,222,905, Cockrell, issued Sep. 16, 1980, and in U.S. Pat. No. 4,239,659, Murphy, issued Dec. 16, 1980. All of these patents are incorporated herein by reference. Of all the surfactants, anionics and nonionics are preferred.

Useful anionic surfactants can themselves be of several different types. For example, water-soluble salts of the higher fatty acids, i.e., "soaps", are useful anionic surfactants in the compositions herein. This includes alkali metal soaps such as the sodium, potassium, ammonium, and alkylolammonium salts of higher fatty acids containing from about 8 to about 24 carbon atoms, and preferably from about 12 to about 18 carbon atoms. Soaps can be made by direct saponification of fats and oils or by the neutralization of free fatty acids. Particularly useful are the sodium and potassium salts of the mixtures of fatty acids derived from coconut oil and tallow, i.e., sodium or potassium tallow and coconut soap.

Additional non-soap anionic surfactants which are suitable for use herein include the water-soluble salts, preferably the alkali metal, and ammonium salts, of organic sulfuric reaction products having in their molecular structure an alkyl group containing from about 10 to about 20 carbon atoms and a sulfonic acid or sulfuric acid ester group. (Included in the term "alkyl" is the alkyl portion of acyl groups.) Examples of this group of synthetic surfactants are a) the sodium, potassium and ammonium alkyl sulfates, especially those obtained by sulfating the higher alcohols ($C_8$–$C_{18}$ carbon atoms) such as those produced by reducing the glycerides of tallow or coconut oil; b) the sodium, potassium and ammonium alkyl polyethoxylate sulfates, particularly those in which the alkyl group contains from 10 to 22, preferably from 12 to 18 carbon atoms, and wherein the polyethoxylate chain contains from 1 to 15, preferably 1 to 6 ethoxylate moieties; and c) the sodium and potassium alkylbenzene sulfonates in which the alkyl group contains from about 9 to about 15 carbon atoms, in straight chain or branched chain configuration, e.g., those of the type described in U.S. Pat. Nos. 2,220,099 and 2,477,383. Especially valuable are linear straight chain alkylbenzene sulfonates in which the average number of carbon atoms in the alkyl group is from about 11 to 13, abbreviated as $C_{11-13}$ LAS.

Preferred nonionic surfactants are those of the formula $R_1(OC_2H_4)_nOH$, wherein $R_1$ is a $C_{10}$–$C_{16}$ alkyl group or a $C_8$–$C_{12}$ alkyl phenyl group, and n is from 3 to about 80. Particularly preferred are condensation products of $C_{12}$–$C_{15}$ alcohols with from about 5 to about 20 moles of ethylene oxide per mole of alcohol, e.g., $C_{12}$–$C_{13}$ alcohol condensed with about 6.5 moles of ethylene oxide per mole of alcohol.

Additional suitable nonionic surfactants include polyhydroxy fatty acid amides of the formula:

wherein R is a $C_{9-17}$ alkyl or alkenyl, $R_1$ is a methyl group and Z is glycityl derived from a reduced sugar or alkoxylated derivative thereof. Examples are N-methyl N-1-deoxyglucityl cocoamide and N-methyl N-1-deoxyglucityl oleamide. Processes for making polyhydroxy fatty acid amides are known and can be found in Wilson, U.S. Pat. No. 2,965,576 and Schwartz, U.S. Pat. No. 2,703,798, the disclosures of which are incorporated herein by reference.

Preferred surfactants for use in the detergent compositions described herein are amine based surfactants of the general formula:

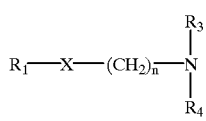

wherein $R_1$ is a $C_6$–$C_{12}$ alkyl group; n is from about 2 to about 4, X is a bridging group which is selected from NH, CONH, COO, or O or X can be absent; and $R_3$ and $R_4$ are individually selected from H, $C_1$–$C_4$ alkyl, or ($CH_2$—$CH_2$—$O(R_5)$) wherein $R_5$ is H or methyl. Especially preferred amines based surfactants include the following:

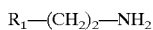

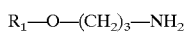

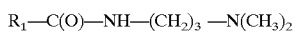

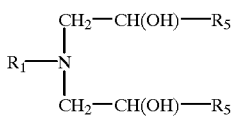

wherein $R_1$ is a $C_6$–$C_{12}$ alkyl group and $R_5$ is H or $CH_3$. Particularly preferred amines for use in the surfactants defined above include those selected from the group consisting of octyl amine, hexyl amine, decyl amine, dodecyl amine, $C_8$–$C_{12}$ bis(hydroxyethyl)amine, $C_8$–$C_{12}$ bis(hydroxyisopropyl)amine, $C_8$–$C_{12}$ amido-propyl dimethyl amine, or mixtures thereof.

In a highly preferred embodiment, the amine based surfactant is described by the formula:

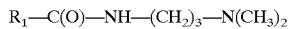

wherein $R_1$ is $C_8$–$C_{12}$ alkyl.

C) Detergent Builder

The detergent compositions herein may also comprise from about 0.1% to 80% by weight of a detergent builder. Preferably such compositions in liquid form will comprise from about 1% to 10% by weight of the builder component. Preferably such compositions in granular form will comprise from about 1% to 50% by weight of the builder component. Detergent builders are well known in the art and can comprise, for example, phosphate salts as well as various organic and inorganic nonphosphorus builders.

Water-soluble, nonphosphorus organic builders useful herein include the various alkali metal, ammonium and substituted ammonium polyacetates, carboxylates, polycarboxylates and polyhydroxy sulfonates. Examples of polyacetate and polycarboxylate builders are the sodium, potassium, lithium, ammonium and substituted ammonium salts of ethylene diamine tetraacetic acid, nitrilotriacetic acid, oxydisuccinic acid, mellitic acid, benzene polycarboxylic acids, and citric acid. Other suitable polycarboxylates for use herein are the polyacetal carboxylates described in U.S. Pat. No. 4,144,226, issued Mar. 13, 1979 to Crutchfield et al., and U.S. Pat. No. 4,246,495, issued Mar. 27, 1979 to Crutchfield et al., both of which are incorporated herein by reference. Particularly preferred polycarboxylate builders are the oxydisuccinates and the ether carboxylate builder compositions comprising a combination of tartrate monosuccinate and tartrate disuccinate described in U.S. Pat. No. 4,663,071, Bush et al., issued May 5, 1987, the disclosure of which is incorporated herein by reference.

Examples of suitable nonphosphorus, inorganic builders include the silicates, aluminosilicates, borates and carbonates. Particularly preferred are sodium and potassium carbonate, bicarbonate, sesquicarbonate, tetraborate decahydrate, and silicates having a weight ratio of $SiO_2$ to alkali metal oxide of from about 0.5 to about 4.0, preferably from about 1.0 to about 2.4. Also preferred are aluminosilicates including zeolites. Such materials and their use as detergent builders are more fully discussed in Corkill et al., U.S. Pat. No. 4,605,509, the disclosure of which is incorporated herein by reference. Also discussed in U.S. Pat. No. 4,605,509 are crystalline layered silicates which are suitable for use in the detergent compositions of this invention.

D) Optional Detergent Ingredients

In addition to the surfactants, builders and linear amine based polymer, oligomer or copolymer materials hereinbefore described, the detergent compositions of the present invention can also include any number of additional optional ingredients. These include conventional detergent composition components such as enzymes and enzyme stabilizing agents, suds boosters or suds suppressers, anti-tarnish and anticorrosion agents, bleaching agents, soil suspending agents, soil release agents, germicides, pH adjusting agents, non-builder alkalinity sources, chelating agents, organic and inorganic fillers, solvents, hydrotropes, optical brighteners, dyes and perfumes.

pH adjusting agents may be necessary in certain applications where the pH of the wash solution is greater than about 10.0 because the fabric integrity benefits of the defined compositions begin to diminish at a higher pH. Hence, if the wash solution is greater than about 10.0 after the addition of the linear amine based polymer, oligomer or copolymer materials of the present invention a pH adjuster should be used to reduce the pH of the washing solution to below about 10.0, preferably to a pH of below about 9.5 and most preferably below about 7.5. Suitable pH adjusters will be known to those skilled in the art.

A preferred optional ingredients for incorporation into the detergent compositions herein comprises a bleaching agent, e.g., a peroxygen bleach. Such peroxygen bleaching agents may be organic or inorganic in nature. Inorganic peroxygen bleaching agents are frequently utilized in combination with a bleach activator.

Useful organic peroxygen bleaching agents include percarboxylic acid bleaching agents and salts thereof Suitable examples of this class of agents include magnesium monoperoxyphthalate hexahydrate, the magnesium salt of metachloro perbenzoic acid, 4-nonylamino-4-oxoperoxybutyric acid and diperoxydodecanedioic acid. Such bleaching agents are disclosed in U.S. Pat. No. 4,483,781, Hartman, Issued Nov. 20, 1984; European Patent Application EP-A-133,354, Banks et al., Published Feb. 20, 1985; and U.S. Pat. No. 4,412,934, Chung et al., Issued Nov. 1, 1983. Highly preferred bleaching agents also include 6-nonylamino-6-oxoperoxycaproic acid (NAPAA) as described in U.S. Pat. No. 4,634,551, Issued Jan. 6, 1987 to Burns et al.

Inorganic peroxygen bleaching agents may also be used, generally in particulate form, in the detergent compositions herein. Inorganic bleaching agents are in fact preferred. Such inorganic peroxygen compounds include alkali metal perborate and percarbonate materials. For example, sodium perborate (e.g. mono- or tetra-hydrate) can be used. Suitable inorganic bleaching agents can also include sodium or potassium carbonate peroxyhydrate and equivalent "percarbonate" bleaches, sodium pyrophosphate peroxyhydrate, urea peroxyhydrate, and sodium peroxide. Persulfate bleach (e.g., OXONE, manufactured commercially by DuPont) can also be used. Frequently inorganic peroxygen bleaches will be coated with silicate, borate, sulfate or water-soluble surfactants. For example, coated percarbonate particles are available from various commercial sources such as FMC, Solvay Interox, Tokai Denka and Degussa.

Inorganic peroxygen bleaching agents, e.g., the perborates, the percarbonates, etc., are preferably combined with bleach activators, which lead to the in situ production in aqueous solution (i.e., during use of the compositions herein for fabric laundering/bleaching) of the peroxy acid corresponding to the bleach activator. Various non-limiting examples of activators are disclosed in U.S. Pat. No. 4,915,854, Issued Apr. 10, 1990 to Mao et al.; and U.S. Pat. No. 4,412,934 Issued Nov. 1, 1983 to Chung et al. The nonanoyloxybenzene sulfonate (NOBS) and tetraacetyl ethylene diamine (TAED) activators are typical and preferred. Mixtures thereof can also be used. See also the hereinbefore referenced U.S. Pat. No. 4,634,551 for other typical bleaches and activators useful herein.

Other useful amido-derived bleach activators are those of the formulae:

or

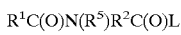

wherein $R^1$ is an alkyl group containing from about 6 to about 12 carbon atoms, $R^2$ is an alkylene containing from 1 to about 6 carbon atoms, $R^5$ is H or alkyl, aryl, or alkaryl containing from about 1 to about 10 carbon atoms, and L is any suitable leaving group. A leaving group is any group that is displaced from the bleach activator as a consequence of the nucleophilic attack on the bleach activator by the perhydrolysis anion. A preferred leaving group is phenol sulfonate.

Preferred examples of bleach activators of the above formulae include (6-octanamido-caproyl) oxybenzenesulfonate, (6-nonanamidocaproyl) oxybenzenesulfonate, (6-decanamido-caproyl) oxybenzenesulfonate and mixtures thereof as described in the hereinbefore referenced U.S. Pat. No. 4,634,551.

Another class of useful bleach activators comprises the benzoxazin-type activators disclosed by Hodge et al. in U.S. Pat. No. 4,966,723, Issued Oct. 30, 1990, incorporated herein by reference. A highly preferred activator of the benzoxazin-type is:

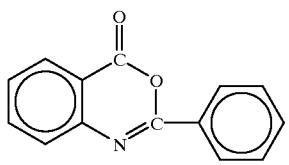

Still another class of useful bleach activators includes the acyl lactam activators, especially acyl caprolactams and acyl valerolactams of the formulae:

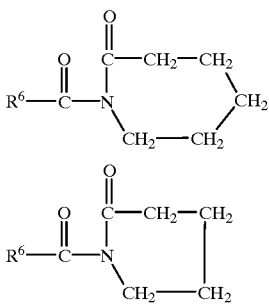

wherein $R^6$ is H or an alkyl, aryl, alkoxyaryl, or alkaryl group containing from 1 to about 12 carbon atoms. Highly preferred lactam activators include benzoyl caprolactam, octanoyl caprolactam, 3,5,5-trimethylhexanoyl caprolactam, nonanoyl caprolactam, decanoyl caprolactam, undecenoyl caprolactam, benzoyl valerolactam, octanoyl valerolactam, nonanoyl valerolactam, decanoyl valerolactam, undecenoyl valerolactam, 3,5,5-trimethylhexanoyl valerolactam and mixtures thereof. See also U.S. Pat. No. 4,545,784, Issued to Sanderson, Oct. 8, 1985, incorporated herein by reference, which discloses acyl caprolactams, including benzoyl caprolactam, adsorbed into sodium perborate.

If utilized, peroxygen bleaching agent will generally comprise from about 2% to 30% by weight of the detergent compositions herein. More preferably, peroxygen bleaching agent will comprise from about 2% to 20% by weight of the compositions. Most preferably, peroxygen bleaching agent will be present to the extent of from about 3% to 15% by weight of the compositions herein. If utilized, bleach activators can comprise from about 2% to 10% by weight of the detergent compositions herein. Frequently, activators are employed such that the molar ratio of bleaching agent to activator ranges from about 1:1 to 10:1, more preferably from about 1.5:1 to 5:1.

Another highly preferred optional ingredient in the detergent compositions herein is a detersive enzyme component. Enzymes can be included in the present detergent compositions for a variety of purposes, including removal of protein-based, carbohydrate-based, or triglyceride-based stains from substrates, for the prevention of refugee dye transfer in fabric laundering, and for fabric restoration. Suitable enzymes include proteases, amylases, lipases, cellulases, peroxidases, and mixtures thereof of any suitable origin, such as vegetable, animal, bacterial, fungal and yeast origin. Preferred selections are influenced by factors such as pH-activity and/or stability, optimal thermostability, and stability to active detergents, builders and the like. In this respect bacterial or fungal enzymes are preferred, such as bacterial amylases and proteases, and fingal cellulases.

"Detersive enzyme", as used herein, means any enzyme having a cleaning, stain removing or otherwise beneficial effect in a laundry detergent composition. Preferred enzymes for laundry purposes include, but are not limited to, proteases, cellulases, lipases, amylases and peroxidases.

Enzymes are normally incorporated into detergent compositions at levels sufficient to provide a "cleaning-effective amount". The term "cleaning-effective amount" refers to any amount capable of producing a cleaning, stain removal, soil removal, whitening, deodorizing, or freshness improving effect on substrates such as fabrics. In practical terms for current commercial preparations, typical amounts are up to about 5 mg by weight, more typically 0.01 mg to 3 mg, of active enzyme per gram of the detergent composition. Stated otherwise, the compositions herein will typically comprise from 0.001% to 5%, preferably 0.01%–1% by weight of a commercial enzyme preparation. Protease enzymes are usually present in such commercial preparations at levels sufficient to provide from 0.005 to 0.1 Anson units (AU) of activity per gram of composition. Higher active levels may be desirable in highly concentrated detergent formulations.

Suitable examples of proteases are the subtilisins which are obtained from particular strains of *B. subtilis* and *B. licheniformis*. One suitable protease is obtained from a strain of Bacillus, having maximum activity throughout the pH range of 8–12, developed and sold as ESPERASE® by Novo Industries A/S of Denmark, hereinafter "Novo". The preparation of this enzyme and analogous enzymes is described in GB 1,243,784 to Novo. Other suitable proteases include ALCALASE® and SAVINASE® from Novo and MAXATASE® from International Bio-Synthetics, Inc., The Netherlands; as well as Protease A as disclosed in EP 130,756 A, Jan. 9, 1985 and Protease B as disclosed in EP 303,761 A, Apr. 28, 1987 and EP 130,756 A, Jan. 9, 1985. See also a high pH protease from Bacillus sp. NCIMB 40338 described in WO 9318140 A to Novo. Enzymatic detergents comprising protease, one or more other enzymes, and a reversible protease inhibitor are described in WO 9203529 A to Novo. Other preferred proteases include those of WO 9510591 A to Procter & Gamble. When desired, a protease having decreased adsorption and increased hydrolysis is available as described in WO 9507791 to Procter & Gamble.

A recombinant trypsin-like protease for detergents suitable herein is described in WO 9425583 to Novo.

Cellulases usable herein include both bacterial and fungal types, preferably having a pH optimum between 5 and 10. U.S. Pat. No. 4,435,307, Barbesgoard et al., Mar. 6, 1984, discloses suitable fungal cellulases from *Humicola insolens* or Humicola strain DSM1800 or a cellulase 212-producing fungus belonging to the genus Aeromonas, and cellulase extracted from the hepatopancreas of a marine mollusk, *Dolabella Auricula Solander*. Suitable cellulases are also disclosed in GB-A-2.075.028; GB-A-2.095.275 and DE-OS-2.247.832. CAREZYME® and CELLUZYME® (Novo) are especially useful. See also WO 9117243 to Novo.

Suitable lipase enzymes for detergent usage include those produced by microorganisms of the Pseudomonas group, such as *Pseudomonas stutzeri* ATCC 19.154, as disclosed in GB 1,372,034. See also, the lipase in Japanese Patent Application 53,20487, laid open Feb. 24, 1978. This lipase is available from Amano Pharmaceutical Co. Ltd., Nagoya, Japan, under the trade name Lipase P "Amano," or "Amano-P." Other suitable commercial lipases include Amano-CES, lipases ex *Chromobacter viscosum*, e.g. *Chromobacter viscosm* var. *lipolyticum* NRRLB 3673 from Toyo Jozo Co., Tagata, Japan; *Chromobacter viscosum* lipases from U.S. Biochemical Corp., U.S.A. and Disoynth Co., The Netherlands, and lipases ex *Pseudomonas gladioli*. LIPO-LASE® enzyme derived from *Humicola lanuginiosa* and commercially available from Novo, see also EP 341,947, is a preferred lipase for use herein.

The enzyme-containing compositions herein may optionally also comprise from about 0.001% to about 10%, preferably from about 0.005% to about 8%, most preferably from about 0.01% to about 6%, by weight of an enzyme stabilizing system. The enzyme stabilizing system can be any stabilizing system which is compatible with the detersive enzyme. Such a system may be inherently provided by other formulation actives, or be added separately, e.g., by the formulator or by a manufacturer of detergent-ready enzymes. Such stabilizing systems can, for example, comprise calcium ion, boric acid, propylene glycol, short chain carboxylic acids, boronic acids, and mixtures thereof, and are designed to address different stabilization problems depending on the type and physical form of the detergent composition.

E) Detergent Composition Preparation

The detergent compositions according to the present invention can be in liquid, paste or granular form. Such compositions can be prepared by combining the essential and optional components in the requisite concentrations in any suitable order and by any conventional means.

Granular compositions, for example, are generally made by combining base granule ingredients, e.g., surfactants, builders, water, etc., as a slurry, and spray drying the resulting slurry to a low level of residual moisture (5–12%). The remaining dry ingredients, e.g., granules of the essential linear amine based fabric treatment materials, can be admixed in granular powder form with the spray dried granules in a rotary mixing drum. The liquid ingredients, e.g., solutions of the essential linear amine based fabric treatment materials, enzymes, binders and perfumes, can be sprayed onto the resulting granules to form the finished detergent composition. Granular compositions according to the present invention can also be in "compact form", i.e. they may have a relatively higher density than conventional granular detergents, i.e. from 550 to 950 g/l. In such case, the granular detergent compositions according to the present invention will contain a lower amount of "inorganic filler salt", compared to conventional granular detergents; typical filler salts are alkaline earth metal salts of sulphates and chlorides, typically sodium sulphate; "compact" detergents typically comprise not more than 10% filler salt.

Liquid detergent compositions can be prepared by admixing the essential and optional ingredients thereof in any desired order to provide compositions containing components in the requisite concentrations. Liquid compositions according to the present invention can also be in "compact form", in such case, the liquid detergent compositions according to the present invention will contain a lower amount of water, compared to conventional liquid detergents. Addition of the linear amine based polymer, oligomer or copolymer materials to liquid detergent or other aqueous compositions of this invention may be accomplished by simply mixing into the liquid solutions the desired linear amine based fabric treatment materials.

F) Fabric Laundering Method

The present invention also provides a method for laundering fabrics in a manner which imparts fabric appearance benefits provided by the linear amine based polymer, oligomer or copolymer materials used herein. Such a method employs contacting these fabrics with an aqueous washing solution formed from an effective amount of the detergent compositions hereinbefore described or formed from the individual components of such compositions. Contacting of fabrics with washing solution will generally occur under conditions of agitation although the compositions of the present invention may also be used to form aqueous unagitated soaking solutions for fabric cleaning and treatment. As discussed above, it is preferred that the washing solution have a pH of less than about 10.0, preferably it has a pH of about 9.5 and most preferably it has a pH of about 7.5.

Agitation is preferably provided in a washing machine for good cleaning. Washing is preferably followed by drying the wet fabric in a conventional clothes dryer. An effective amount of a high density liquid or granular detergent composition in the aqueous wash solution in the washing machine is preferably from about 500 to about 7000 ppm, more preferably from about 1000 to about 3000 ppm.

G) Fabric Conditioning

The linear amine based polymer, oligomer or copolymer materials hereinbefore described as components of the laundry detergent compositions herein may also be used to treat and condition fabrics and textiles in the absence of the surfactant and builder components of the detergent composition embodiments of this invention. Thus, for example, a fabric conditioning composition comprising only the linear amine based fabric treatment materials themselves, or comprising an aqueous solution of the linear amine based fabric treatment materials, may be added during the rinse cycle of a conventional home laundering operation in order to impart the desired fabric appearance and integrity benefits hereinbefore described.

EXAMPLES

The following examples illustrate the compositions and methods of the present invention, but are not necessarily meant to limit or otherwise define the scope of the invention.

Example I

The synthesis of one preferred compound of the present invention is described below. Those skilled in the art will be able to modify this description to synthesize other compounds without undue experimentation.

Synthesis of 2:1 Bis(hexamethylene) triamine:Epichlorohydrin Oligomer

Prepare a 2 L, three neck, round bottom flask equipped with a magnetic stirring bar, condenser, addition funnel, thermometer, and temperature controller (Therm-O-Watch, I²R). Add to the flask bis(hexamethylene)triamine (Aldrich, ren Hildebrand Elisabeth Kappes 713.5 g, 3.3 mol) and methanol (Baker, approximately 400 ml). The solution is blanketed with argon and heated to reflux. Epichlorohydrin (Aldrich, 153.2 g, 1.66 mol) is added neat over approximately 45 minutes. The solution is heated at reflux overnight. A $^{13}$C-NMR (dmso-$d_6$) shows the absence of peaks corresponding to epichlorohydrin at approximately 45 ppm, approximately 46 ppm, and approximately 51 ppm. A new peak will appear at approximately 50 ppm along with many more new peaks in the 54–70 ppm region. The resulting bulk material is divided into four 1 L round bottom flasks and each flask is heated in a Kugelrohr apparatus (Aldrich) at 170° C and approximately 2 mmHg for 2 hrs. as methanol and unreacted bis(hexamethylene)triamine distill from the mixture. After cooling, 719 g of product is recovered as a tan waxy solid. A $^{13}$C-NMR on this thoroughly stripped and heated sample shows peaks at approximately 50 ppm and a simplified 54–70 ppm region with peaks at 54.6, 55, 60, 67.7, and 68.6 ppm which are consistent with 2-hydroxy-1,3-propylene-linked amines.

In a preferred variation of the above synthesis, a more easily soluble product is formed by ensuring better mixing as the epichlorohydrin is added by diluting the epichlorohydrin with solvent and stirring more vigorously. In another preferred variation, the reaction mixture is heated to about 150–180° C. before applying vacuum. This allows any azetidine intermediates to further react in the presence of the excess bis(hexamethylene)triamine prior to its being removed by stripping.

Base liquid and granular detergent compositions were prepared. Various linear amine based polymer, oligomer or copolymer materials were added to the base detergent compositions as described below.

Example II

Granular Detergent Test Composition Preparation

Several granular detergent compositions are prepared containing various linear amine based polymer, oligomer or copolymer materials. Such granular detergent compositions all have the following formulas:

| Component | Example 1 Wt % | Example 2 Wt % |
|---|---|---|
| $C_{12}$ Linear alkyl benzene sulfonate | 9.40 | 9.40 |
| $C_{14-15}$ alkyl sulfonate | 11.26 | 11.26 |
| Zeolite Builder | 27.79 | 27.79 |
| Sodium Carbonate | 27.31 | 27.31 |
| PEG 4000 | 1.60 | 1.60 |
| Dispersant | 2.26 | 2.26 |
| $C_{12-13}$ alkyl ethoxylate (E9) | 1.5 | 1.5 |
| Sodium Perborate | 1.03 | 1.03 |
| Soil Release Polymer | 0.41 | 0.41 |
| Enzymes | 0.46 | 0.46 |
| Condensate of bis(hexamethylene)triamine and epichlorohydrin from Example I | 0.8 | 1.6 |
| Perfume, Brightener, Suds Suppressor, Other Minors, Moisture, Sulfate | Balance | Balance |
| | 100% | 100% |

| Component | Examples 3–22 Wt % |
|---|---|
| $C_{12}$ Linear alkyl benzene sulfonate | 9.31 |
| $C_{14-15}$ alkyl sulfonate | 12.74 |
| Zeolite Builder | 27.79 |
| Sodium Carbonate | 27.31 |
| PEG 4000 | 1.60 |
| Dispersant | 2.26 |
| $C_{12-13}$ alkyl ethoxylate (E9) | 1.5 |
| Sodium Perborate | 1.03 |
| Soil Release Polymer | 0.41 |
| Enzymes | 0.59 |
| Polymer/oligomer as in TABLE II | See Table II |
| Perfume, Brightener, Suds Suppressor, Other Minors, Moisture, Sulfate | Balance |
| | 100% |

TABLE II

| # | Polymer* | wt. % |
|---|---|---|
| 3 | Bis(hexamethylene)triamine | 1.6 |
| 4 | Bis(hexamethylene)triamine | 3.2 |
| 5 | Adduct of Aminopropyldiethanolamine and epi (ratio 2:1) | 0.8 |
| 6 | Adduct of N,N bis(3-aminopropyl)methylamine and epi (Ratio 2:1) | 0.8 |
| 7 | Adduct of N-(2-Aminoethyl) ethanolamine and epi (Ratio 2:1) | 0.8 |
| 8 | Adduct of N,N bis(aminopropyl)ethylenediamine and epi (Ratio 2:1) | 0.8 |
| 9 | Dipropylenetriamine-epi 2:1 | 0.8 |
| 10 | Adduct of 2 amino-5 (diethylamino) pentane and epi (ratio 2:1) | 0.8 |
| 11 | Adduct of Diethylaminoethylamine and epi (Ratio 2:1) | 0.8 |
| 12 | Adduct of 2(ethylamino) ethyleneamine and epi (Ratio 1.5:1) | 0.8 |
| 13 | Adduct of 4,9 Dioxadodecane, 1,12 diamine and epi (Ratio 2:1) | 0.8 |
| 14 | Adduct of 4,7,10 trioxitridecan 1, 13 diamine and epi (Ratio 1.5:1) | 0.8 |
| 15 | Oligomer made by condensation of N,N,N',N' tetramethyl 1,6 hexamethylenediamine and 1,6 dibromo hexane (ratio 4:3) | 3.0 |
| 16 | Oligomer made by condensation of N,N,N',N' tetramethyl 1,6 hexanediamine and 1,6 dibromo dodecane (ratio 4:3) | 3.0 |
| 17 | Oligomer made by condensation of N,N,N',N' tetramethyl 1,6 hexamethylenediamine and 1,6 dibromo hexane (ratio 2:1) | 3.0 |
| 18 | Oligomer made by condensation of N,N,N',N' tetramenthyl 1,6 hexamethylenediamine and 1,6 dibromo hexane (ratio 3:2) | 3.0 |
| 19 | Methylated adduct of bis(hexamethylene)triamine | 1.1 |
| 20 | Hydroxypropyl N, N bis(3aminopropyl) methylamine:epi (2:1) | 0.8 |
| 21 | Hydroxyethyl N, N bis(3aminopropyl) methylamine:epi (2:1) | 1.4 |
| 22 | Hydroxyethyl bis(hexamethylene)triamine adduct | 0.8 |

Example III

Liquid Detergent Compositions

Several liquid detergent compositions are prepared containing various linear amine polymer, oligomer or copolymer materials. Such liquid detergent compositions all the following formulas:

| Component | Examples 24–31 Wt. % |
|---|---|
| $C_{12-15}$ alkyl ether (2.5) sulfate | 19.0 |
| $C_{12-13}$ alkyl ethoxylate (9.0) | 2.00 |
| $C_{12-14}$ glucose amide | 3.50 |
| Citric Acid | 3.00 |
| $C_{12-14}$ Fatty Acid | 2.00 |

-continued

| Component | Examples 24–31 Wt. % |
|---|---|
| MEA | to pH 8 |
| Ethanol | 3.4 |
| Propanediol | 6.51 |
| Borax | 2.5 |
| Dispersant | 1.18 |
| Na Toluene Sulfonate | 2.50 |
| Oligomer and/or polymer as shown in Table III | as in Table III |
| Dye, Perfume, Brighteners, Enzymes, Preservatives, Suds Suppressor, Other Minors, Water | Balance |
| | 100% |

TABLE III

| # | Polymer* | wt. % |
|---|---|---|
| 24 | Bis(hexamethylene)triamine | 0.5 |
| 25 | Adduct of Bis(hexamethylene)triamine and epichlorohydrin (ratio 2:1) | 0.5 |
| 26 | Adduct of Bis(hexamethylene)triamine and epichlorohydrin (ratio 1.5:1) | 0.5 |
| 27 | N(3 aminopropyl)1,3 propanediamine | 0.5 |
| 28 | N-(2 aminoethyl)1,3 propanediamine | 0.5 |
| 29 | N,N' bis(3 aminopropyl) ethylenediamine | 0.5 |
| 30 | N,N,N',N'-tetrakis(aminopropyl) butanediamine | 2.0 |
| 31 | Dendrimer Generation 2 | 2.0 |

What is claimed is:

1. A detergent composition comprising:

a) from about 1% to about 80% by weight of surfactants selected from the group consisting of nonionic, anionic, cationic, amphoteric surfactants, and mixtures thereof; and b) from about 0.1% to about 5.0% by weight of a mixture of linear amine based polymers, oligomers or copolymers of the general formula:

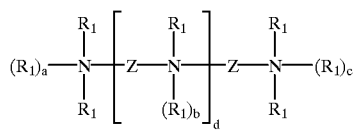

wherein:

each $R_1$ is independently selected from the group consisting of H, linear or branched $C_1$–$C_{12}$ alkyl, cycloalkyl, aryl, alkylaryl, piperidinoalkyl and other substituted derivatives of piperidine, morpholinoalkyl and other substituted derivatives of morpholine, substituted derivatives of aryl, substituted derivatives of alkylaryl,

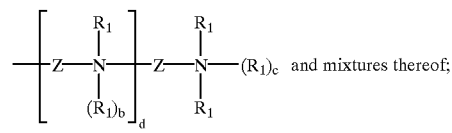 and mixtures thereof;

A is a compatible anion;
a=1;
b=1;
c=1;
d=from 1 to about 50;
e=number required to obtain charge neutrality;

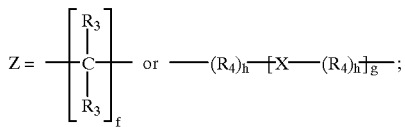

wherein:

each $R_3$ is independently selected from the group consisting of H, $C_1$–$C_{12}$ alkyl, aryl, alkylaryl, substituted derivatives of aryl, substituted derivatives of alkylaryl, hydroxy, amino, halogen and mixtures thereof;

each $R_4$ is linear or branched alkylene;

X is selected from the group consisting of phenylene, cyclohexylene, substituted residues of phenylene, substituted residues of cyclohexylene, —O—, —COO— and —CON($R_5$)—;

$R_5$ is selected from the group consisting of H, $C_1$–$C_4$ alkyl and hydroxyalkyl;

f=from about 2 to about 12;

g=from about 1 to about 10 when X is —COO— or —CON($R_5$)—;

g=from about 1 to about 100 when X is —O—; otherwise g=1;

h=0 or 1;

provided that when one $R_3$ group is hydroxy or amino, the other $R_3$ group on the same carbon is not a hydroxy, amino or halogen; and further provided that within Z no carbon has more than one substituent selected from the group consisting of hydroxy, amino, and halo.

2. The detergent composition of claim 1 wherein $R_1$ is selected from the group consisting of —H, —$CH_3$, and —$CH_2CH_3$, and mixtures thereof.

3. The detergent composition of claim 1, wherein Z is selected from the group consisting of —$(CH_2)_x$—, —$CH_2CHOHCH_2$—, —$(CH_2)_3CH(CH_3)$—, and mixtures thereof, where x is from about 2 to about 12.

4. The detergent composition of claim 3, wherein x is 3, 6 or 12.

5. A laundry additive composition comprising:

a) from about 1% to about 80% by weight of water; and b) from about 0.1% to about 80.0% by weight of a mixture of linear amine based polymers, oligomers or copolymers of the general formula:

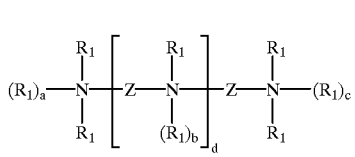

wherein:

each $R_1$ is independently selected from the group consisting of H, linear or branched $C_1$–$C_{12}$ alkyl, cycloalkyl, aryl, alkylaryl, piperidinoalkyl and other substituted derivatives of piperidine, morpholinoalkyl and other substituted derivatives of morpholine, substituted derivatives of aryl, substituted derivatives of alkylaryl,

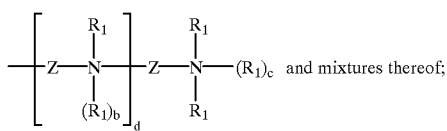

A is a compatible anion;
a=1;
b=1;
c=1;
d=from 1 to about 50;
e=number required to obtain charge neutrality;

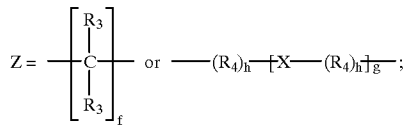

wherein:
each $R_3$ is independently selected from the group consisting of H, $C_1$–$C_{12}$ alkyl, aryl, alkylaryl, substituted derivatives of aryl, substituted derivatives of alkylaryl, hydroxy, amino, halogen and mixtures thereof;
each $R_4$ is linear or branched alkylene;
X is selected from the group consisting of phenylene, cyclohexylene, substituted residues of phenylene, substituted residues of cyclohexylene, —O—, —COO— and —CON($R_5$)—;

$R_5$ is selected from the group consisting of H, $C_1$–$C_4$ alkyl and hydroxyalkyl;
f=from about 2 to about 12;
g=from about 1 to about 10 when X is —COO— or —CON($R_5$)—;
g=from about 1 to about 100 when X is —O—; otherwise
g=1;
h=0 or 1;
provided that when one $R_3$ group is hydroxy or amino, the other $R_3$ group on the same carbon is not a hydroxy, amino or halogen; and
further provided that within Z no carbon has more than one substituent selected from the group consisting of hydroxy, amino, and halo.

6. The laundry additive composition of claim 5 wherein $R_1$ is selected from the group consisting of —H, —$CH_3$, and —$CH_2CH_3$, and mixtures thereof.

7. The laundry additive composition claim 5, wherein Z is selected from the group consisting of —($CH_2$)$_x$—, —$CH_2CHOHCH_2$—, —($CH_2$)$_3CH(CH_3)$—, and mixtures thereof, where x is from about 2 to about 12.

8. The laundry additive composition of claim 7, wherein x is 3, 6 or 12.

9. The detergent composition of claim 1, wherein d is from 1 to about 25.

10. The detergent composition of claim 1, wherein d is from about 4 to about 20.

* * * * *